US008433780B2

(12) United States Patent
Cherry et al.

(10) Patent No.: US 8,433,780 B2
(45) Date of Patent: Apr. 30, 2013

(54) SYSTEMS AND METHODS FOR AUTOMATICALLY CONFIGURING A CLIENT FOR REMOTE USE OF A NETWORK-BASED SERVICE

(75) Inventors: Darrel D. Cherry, Boise, ID (US); James Clough, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2471 days.

(21) Appl. No.: 10/453,980

(22) Filed: Jun. 4, 2003

(65) Prior Publication Data

US 2005/0021703 A1  Jan. 27, 2005

(51) Int. Cl.
*G06F 15/173* (2006.01)

(52) U.S. Cl.
USPC .......................................................... 709/223

(58) Field of Classification Search .................. None
See application file for complete search history.

(56) References Cited

U.S. PATENT DOCUMENTS

| 6,061,796 | A * | 5/2000 | Chen et al. ................ 709/225 |
| 6,157,953 | A * | 12/2000 | Chang et al. ............... 709/225 |
| 6,292,833 | B1 * | 9/2001 | Liao et al. ................. 709/225 |
| 6,357,010 | B1 * | 3/2002 | Viets et al. ................ 709/225 |
| 6,381,631 | B1 * | 4/2002 | van Hoff .................... 709/225 |
| 6,415,323 | B1 * | 7/2002 | McCanne et al. ........... 709/225 |
| 6,453,353 | B1 * | 9/2002 | Win et al. .................. 709/225 |
| 6,868,447 | B1 * | 3/2005 | Slaughter et al. .......... 709/225 |
| 6,898,618 | B1 * | 5/2005 | Slaughter et al. .......... 709/227 |
| 6,922,725 | B2 * | 7/2005 | Lamming et al. ........... 709/227 |
| 7,321,435 | B2 * | 1/2008 | Cherry et al. .............. 358/1.14 |
| 7,389,414 | B2 * | 6/2008 | Hibino et al. .............. 709/228 |
| 2004/0227971 | A1 | 11/2004 | Clough et al. |
| 2004/0230646 | A1 | 11/2004 | Clough et al. |
| 2004/0246514 | A1 | 12/2004 | Clough et al. |
| 2004/0246518 | A1 | 12/2004 | McKinley et al. |
| 2004/0249733 | A1 | 12/2004 | Clough et al. |
| 2004/0250129 | A1 | 12/2004 | Clough et al. |
| 2004/0257606 | A1 | 12/2004 | Bergstrand et al. |

OTHER PUBLICATIONS

Browne, Shirley et al. "Location-independent naming for virtual distributed software repositories." ACM SIGSOFT software engineering notes, proceedings of the 1995 symposium on Software reusability SSR '95. Aug. 1995. ACM Press. 179-85.*
Kraft, Reiner. "Designing a distributed access control processor for network services on the web." Proceedings of the 2002 ACM workshop on XML security XMLSEC '02. ACM Press. Nov. 2002. 36-52.*
Hodes, Todd et al. "An architecture for secure wide-area service discovery." Wireless Networks. vol. 8, Issue 2/3. Kluwer Academic Publishers. Mar. 2002. 213-30.*
Bacon, Jean et al. "Toward Open, Secure, Widely Distributed Services." Communications of the ACM. Jun. 2002. vol. 45, No. 6. pp. 59-64. ACM Press.*

* cited by examiner

*Primary Examiner* — Jeffrey R Swearingen

(57) ABSTRACT

Disclosed are systems and methods for configuring a client for remote use of a network-based service. In one embodiment, a system and a method include automatically discovering a network-based service supported on a local network to which the client is also connected, communicating with the service via the network, and automatically receiving security information from the service that enables use of the service by the client from a remote location.

14 Claims, 6 Drawing Sheets

SYSTEMS AND METHODS FOR AUTOMATICALLY CONFIGURING A CLIENT FOR REMOTE USE OF A NETWORK-BASED SERVICE

BACKGROUND

For purposes of security, many network-based services require remote users to provide information that can be used by the service to authenticate the user as well as determine that user's authorization to use the service. For example, such users are often required to provide a username and password before the service can be used.

Although the procedure described above facilitates authentication and authorization, there are several drawbacks associated with such a procedure, and others like it. For one, the user must provide the required security information (e.g., username/password). This requires the user to either remember the security information or record it in some manner so that it will be accessible to the user when attempting to remotely access the service. In the former case, the user is likely to forget the security information, particularly if, like most computer users, the user possesses several such usernames/passwords. In the latter case, the user risks discovery of the security information by unauthorized persons (as a result of writing it down), which could lead to the perpetration of fraud and/or the exposure of sensitive information.

In addition to those drawbacks, known security procedures typically require creation and maintenance of a security information database that is supported, for instance, by a host device (e.g., server) that acts as an intermediary between the remote user and the network-based service. Although adequate security can be provided using such an arrangement, it requires infrastructure (e.g., a host device) as well as maintenance of security information for every user that registers with the service.

SUMMARY

Disclosed are systems and methods for configuring a client for remote use of a network-based service. In one embodiment, a system and a method include automatically discovering a network-based service supported on a local network to which the client is also connected, communicating with the service via the network, and automatically receiving security information from the service that enables use of the service by the client from a remote location.

BRIEF DESCRIPTION OF THE DRAWINGS

The disclosed systems and methods can be better understood with reference to the following drawings. The components in the drawings are not necessarily to scale.

DETAILED DESCRIPTION

As described above, current procedures for authenticating a user and determining the user's authorization to use a network-based service present several drawbacks. As is described in this disclosure, however, a client can be automatically configured, as a consequence of the client's connection to a local network to which the network-based service has access, to automatically provide any information needed for authentication and authorization to the service when the service is accessed remotely.

Disclosed herein are example systems and methods that facilitate the configuration process described above. Although this process can be used to configure any client for use with any network-based service, the configuration process and later authentication and authorization are described in the context of a network-based printing service. It is to be understood, however, that the printing service implementation is provided for purposes of example only to facilitate description of the disclosed systems and methods.

Figure 1:
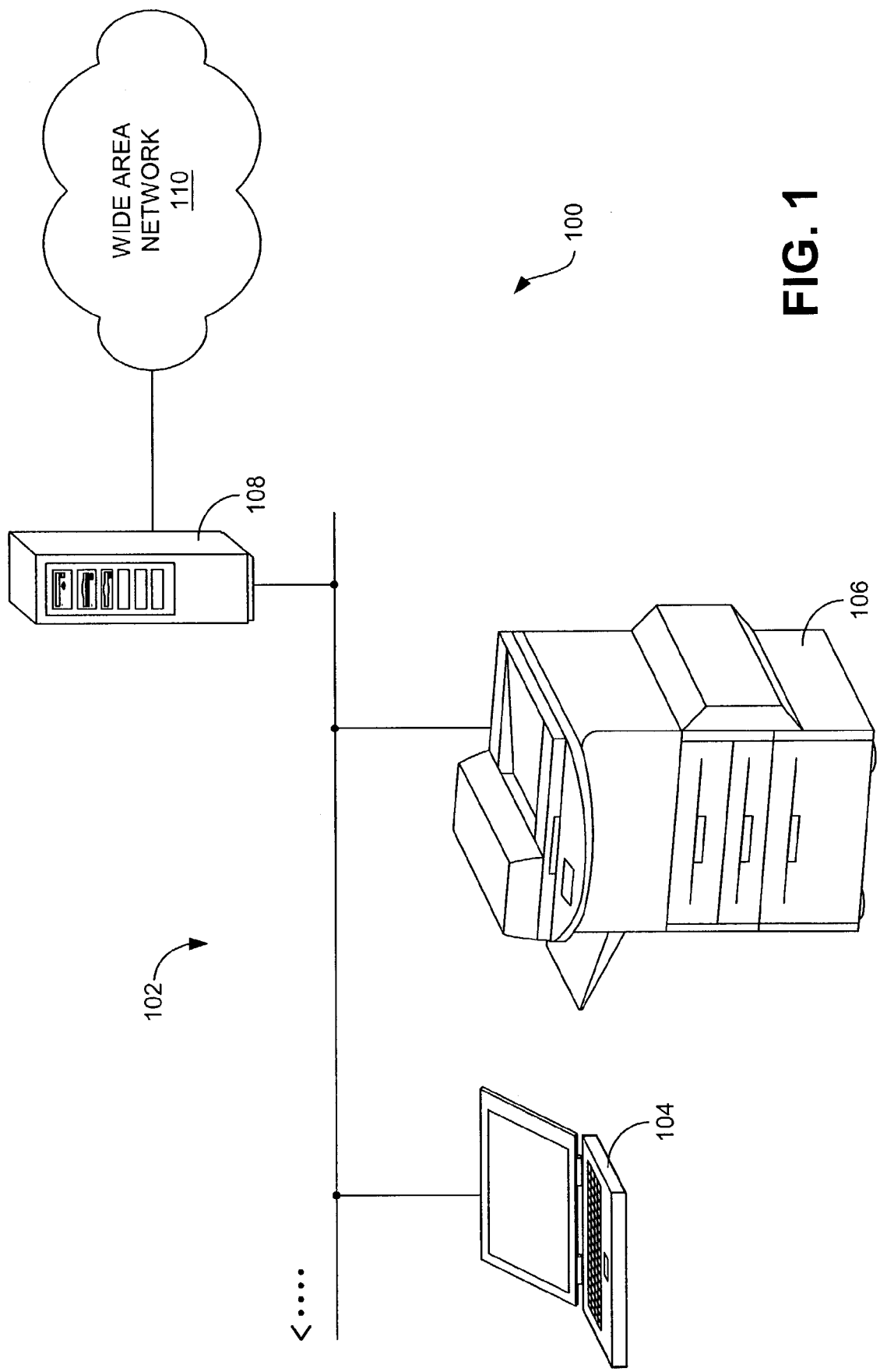
FIG. 1 is a schematic view of an embodiment of a system that supports a network-based service.

Referring now in more detail to the drawings, in which like numerals indicate corresponding parts throughout the several views, FIG. 1 illustrates an example system 100 that facilitates a network-based public printing service. As indicated in this figure, the system 100 includes a local or internal network 102 to which a computing device 104, a printing device 106, and a server computer 108 are connected.

The computing device 104 can be a notebook (or "laptop") computer. More generally, however, the computing device 104 comprises any device having processing and communication capabilities that a user may remove from the internal network 102 and use remotely, or use locally but access the network via a virtual private network (VPN) connection. Accordingly, the computing device 104 can, alternatively, comprise one of a personal digital assistant (PDA), tablet computer, mobile telephone, digital camera, etc. Irrespective of its configuration, the computing device 104 is connectable to the internal network 102 such that the computing device can communicate with one or both of the printing device 106 and the server computer 108. This connection may comprise either a wired connection or a wireless connection (e.g., via a radio frequency (RF) communication protocol). Stored on the computing device 104 is client software (or firmware) that is used to access and use the public printing service, which is facilitated by a printing-service manager.

The printing device 106 comprises any device that can receive print jobs via the internal network 102 and generate hardcopy documents associated with the received jobs. By way of example, the printing device 106 comprises a laser printer. However, other configurations are possible. For instance, the printing device 106 can be a multi-function peripheral (MFP) device that is capable of printing as well as performing other tasks such as copying, scanning, faxing, emailing, etc. As is described in greater detail below, the printing service manager that facilitates the public printing service can be embedded within the printing device 106.

The server computer 108 links the internal network 102 to an external wide area network (WAN) 110, such as the Internet, and therefore acts as a gateway between the internal network and the WAN. As is described below, the server computer 108 is configured to intercept initial communications directed at devices located outside of the internal network 102 (i.e. on the WAN 110). Such interception may be used to offer printing services to the user.

In addition to acting as the network gateway, the server computer 108 (or a separate computer if desired) may be used to provide the network address (e.g., Internet protocol (IP) address) of the printing service manager. Furthermore, the server computer 108 may facilitate billing for rendered printing services by, for instance, posting printing charges to a bill (e.g., hotel bill) or forwarding billing information to a credit card processing service connected to the WAN 110. It is noted that, in some embodiments, the printing service manager, or a portion thereof, may exist on the server computer 108 or another device connected to the network 102.

Figure 2:
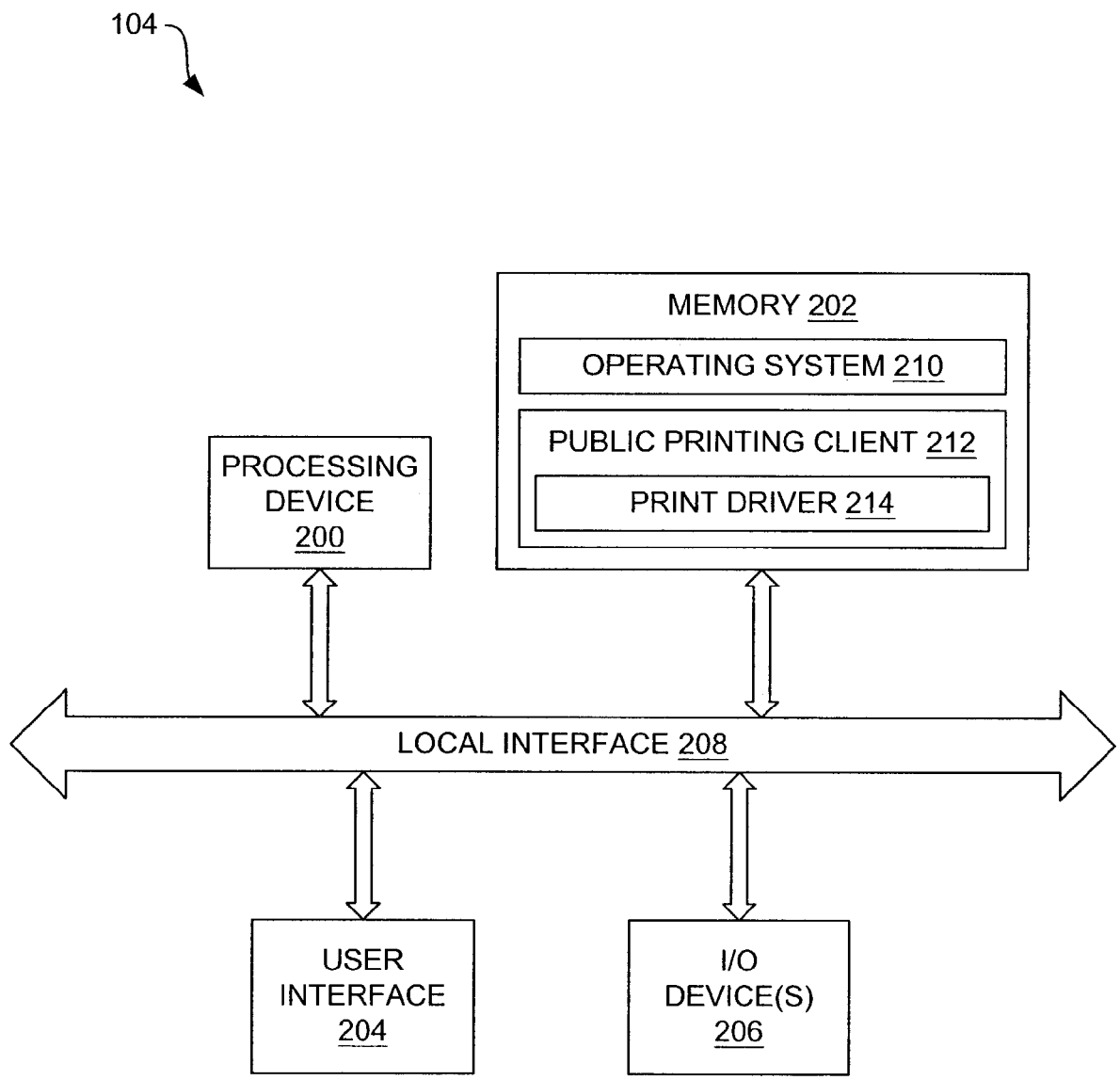
FIG. 2 is a block diagram of an embodiment of a computing device shown in FIG. 1.

FIG. 2 is a block diagram illustrating an example architecture for the computing device 104 shown in FIG. 1. As indicated in FIG. 2, the computing device 104 comprises a processing device 200, memory 202, a user interface 204, and at least one input/output (I/O) device 206. Each of these components is connected to a local interface 208 that, for instance, comprises one or more internal buses.

The processing device 200 is adapted to execute commands stored in memory 202 and can comprise a general-purpose processor, a microprocessor, one or more application-specific integrated circuits (ASICs), a plurality of suitably configured digital logic gates, or other electrical configurations that coordinate the overall operation of the computing device 104. The memory 202 comprises any one or a combination of volatile memory elements (e.g., random access memory (RAM)) and nonvolatile memory elements (e.g., Flash memory, hard disk, etc.) that store or cache data.

The user interface 204 comprises the tools with which user data and commands are input into the computing device 104. In situations in which the computing device 104 comprises a notebook computer, the user interface 204 at least comprises a keyboard and a display. In other embodiments, the user interface may comprise one or more of function keys, buttons, a touch-sensitive display, and a stylus.

The one or more I/O devices 206 facilitate communications with other devices and may include one or more serial, parallel, small computer system interface (SCSI), universal serial bus (USB), or IEEE 1394 (e.g., Firewire™) components, as well as one or more of a modulator/demodulator (e.g., modem), network card, wireless (e.g., RF) transceiver, or other communication component.

The memory 202 includes various programs, in software and/or firmware, including an operating system 210. The operating system 210 controls the execution of other software and provides scheduling, input-output control, file and data management, memory management, and communication control and related services. In addition, the memory 202 comprises a public printing client 212. The public printing client 212 operates in conjunction with the printing service manager to facilitate public printing. By way of example, the public printing client 212 can be downloaded from the printing service manager or from a suitable source on the WAN 110. In any case, however, once stored on the computing device 104, the public printing client 212 can be used to facilitate public printing on any network in which an appropriate printing service manager is provided, thereby providing a substantially universal printing solution.

As is further identified in FIG. 2, the public printing client 212 includes a print driver 214 that is used to translate documents into an appropriate print format. Alternatively, however, the driver 214 could comprise part of the operating system 210. In preferred embodiments, the print driver 214 is a universal driver that can be used in conjunction with substantially any printing device that may be accessed via a compatible printing service manager.

Figure 3:
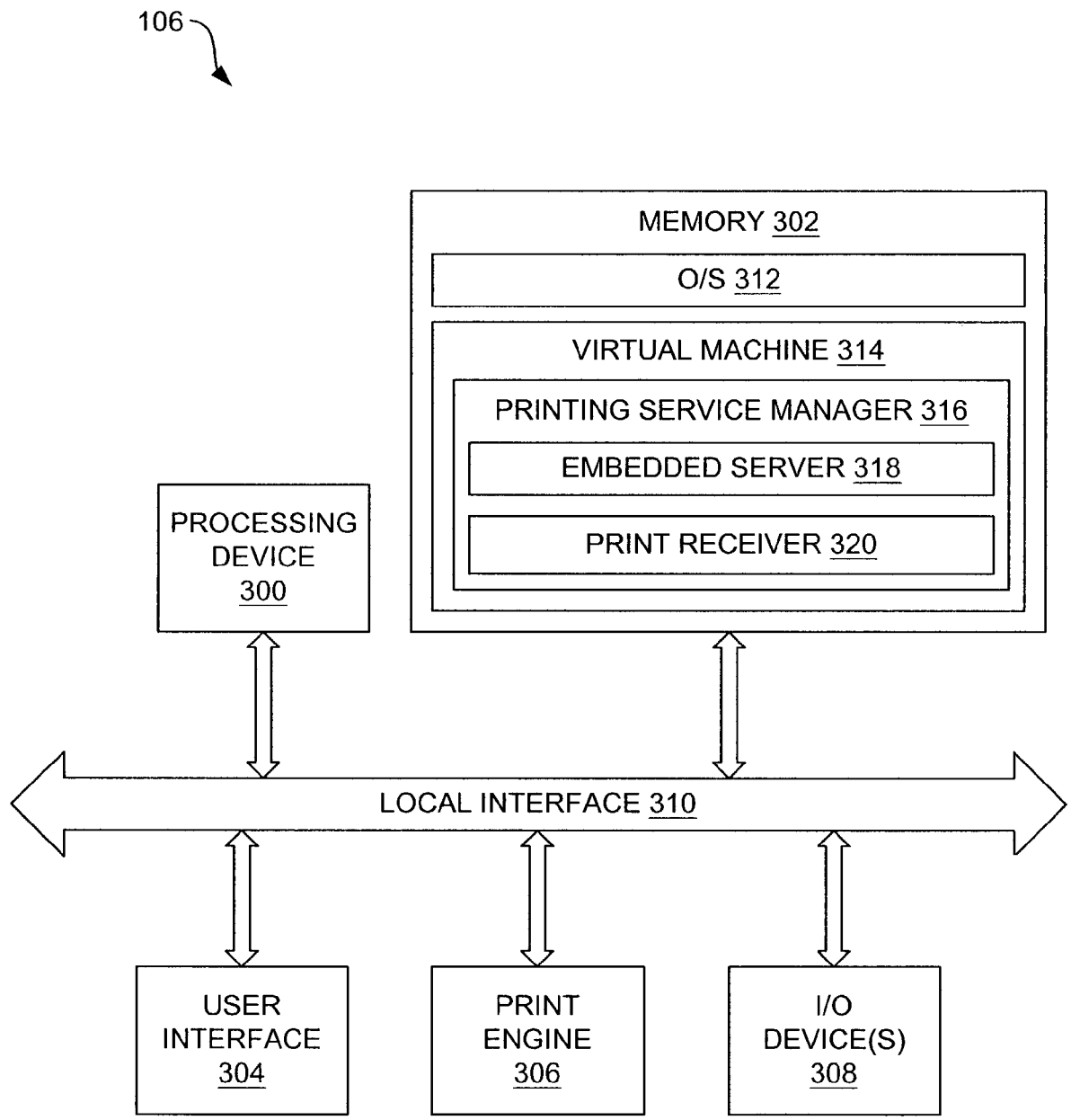
FIG. 3 is a block diagram of an embodiment of a printing device shown in FIG. 1.

FIG. 3 is a block diagram illustrating an example architecture for the printing device 106 shown in FIG. 1. As indicated in FIG. 3, the printing device 106, like the computing device 104, comprises a processing device 300, memory 302, a user interface 304, and at least one I/O device 308, each of which is connected to a local interface 308. In addition, however, the printing device 106 comprises a print engine 306.

The processing device 300, memory 302, and I/O devices 308 have similar configurations to like-named components of the computing device 104 described in relation to FIG. 2. The user interface 304 comprises the components with which users input commands and modify device settings, such as a control panel that incorporates a display (e.g., liquid crystal display (LCD)) and a series of keys or buttons.

The memory 302 comprises various programs, in software and/or firmware, including an operating system 312 and, in this embodiment, a virtual machine 314. The operating system 312 contains the various commands that are used to control the general operation of the printing device 106. The virtual machine 314 is a program that functions as a self-contained operating environment and facilitates operation of a printing service manager 316 that, as noted above, facilitates public printing. Although a virtual machine is explicitly shown and identified, its functionality could, alternatively, be provided by software or firmware stored in the printing device 106. In the embodiment of FIG. 3, however, the manager 316 comprises an applet (e.g., written in the Chai™ programming language of the Hewlett-Packard Company) that includes an embedded server 318 and a print receiver 320. As mentioned above, although the printing service manager 316 is shown as executing on the printing device 106, it could alternatively be provided on a separate device, such as the server computer 108 or another device connected to the internal network 102, if desired.

The embedded server 318 is configured to serve network pages, for instance Web pages, to requesting devices such as the computing device 104. Such pages contain information for the user as to how to use the public printing system hosted by the printing service manager 316, how to obtain public printing client software, the cost of the printing services, the methods of paying for those services, etc.

The print receiver 320 is a module that is configured to receive print jobs transmitted to the printing device 106 via the internal network 102. By way of example, the print receiver 320 is specifically configured to receive hypertext transfer protocol (HTTP) and/or secure HTTP (HTTPS) communications. These communications can be received via an internal port and an external port that each has its own network address (e.g., universal resource locator (URL)) that is used to access the port. In some embodiments, the internal port and the external port may comprise the same port. When a print job is received, the print receiver 320 forwards the job to the print engine 306 for printing.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can used by or in connection with an instruction execution system, apparatus, or device, such as a computer-based system, processor-containing system, or other system that can fetch the instructions from the instruction execution system, apparatus, or device and execute the instructions.

Figure 4:
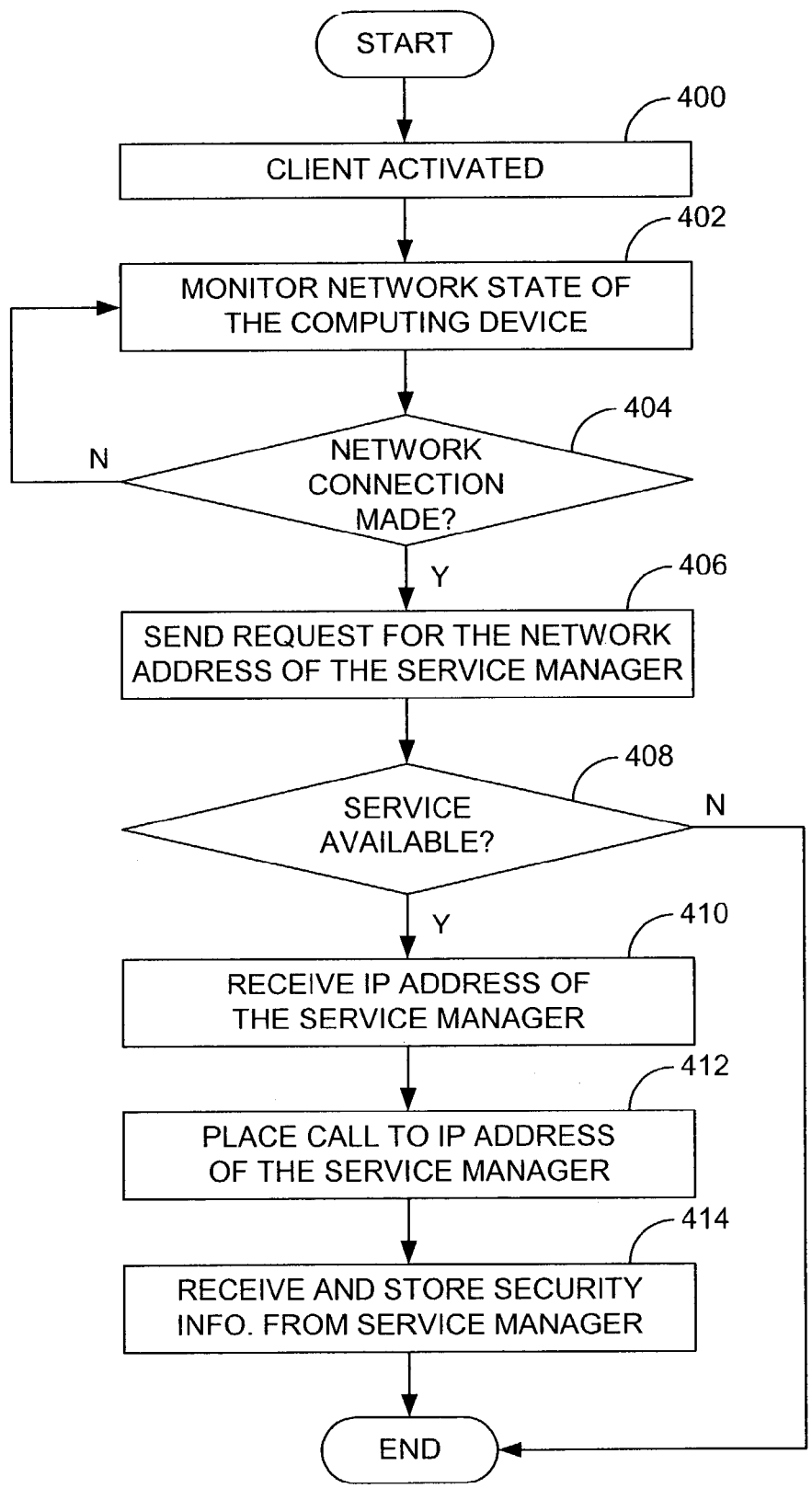
FIG. 4 is a flow diagram that illustrates an embodiment of operation of a client in discovering a network-based service on a local network and registering with the service.

FIG. 4 is a flow diagram that illustrates an embodiment of a discovery process used by a client, such as the public printing client 212 (FIG. 2), to locate a network-based service, such as a printing service. As is described below, through this discovery process, the client is registered with the network-based service and is automatically provided with information that can be used to authenticate and authorize the client when it later attempts to use the service from a remote location, or attempts to use the service via a VPN connection (in which case the client appears to be remotely located).

It is noted that process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 400, a client stored on a computing device is activated. This activation occurs, for instance, when the computing device is powered and booted. In any case, however, once the client is activated it monitors the network state of the computing device, as indicated in block 402, so that the client can detect when the computing device is connected to a network (e.g., internal network 102 (FIG. 1)) that supports the network-based service. By performing this monitoring, it can be determined, as indicated in decision block 404, whether a network connection has been made. If not, flow returns to block 402 at which the client, which runs in the background on the computing device, continues to monitor the device network state.

If a network connection is detected, flow continues from decision block 404 to block 406 at which the client sends a request for the network address of a service manager (e.g., printing service manager 316 (FIG. 3)) that manages the network-based service. This request can, for example, comprise a domain name service (DNS) lookup for a domain name associated with the service. However, other methods may be used to obtain the service manager address. For instance, a service location protocol (SLP) request can be sent to an appropriate device, a request can be generally broadcast on the internal network 102, or the address can simply be located from an appropriate directory.

Next, with reference to decision block 408, it is determined whether the network to which the computing device is connected supports the desired service. By way of example, the availability or unavailability of the service is determined from a response identifying the address, a response indicating that no such address was found, or no response at all. If no address is found or no response is received, the service is not-available and flow is terminated. If, on the other hand, an appropriate response is received, flow continues to block 410 at which the client receives the network (e.g., IP) address of the service manager.

Once the IP address of the service manager has been obtained, the client places a call to that IP address, as indicated in block 412, to communicate with the service manager. Such a communication can be supported using an appropriate network protocol, such as HTTP or HTTPS. It is noted that, in the process described above, the client is proactive in locating the network-based service. Alternatively, however, the client may be relatively passive and the network-based service may instead take an active role in identifying the client and initiating communications, with the client.

Figure 5:
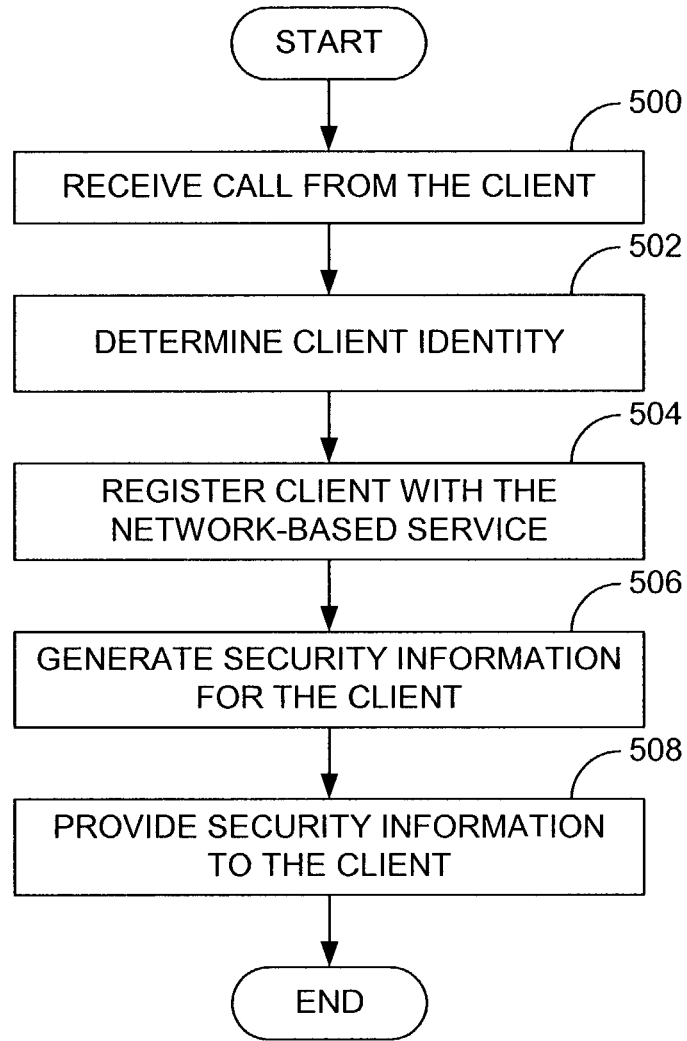
FIG. 5 is a flow diagram that illustrates an embodiment of operation of a service manager in registering a client and providing security information to the client that is presented when attempting to access the service from a remote location.

Referring now to FIG. 5, which illustrates an example of operation of the service manager (e.g., the printing service manager 316 (FIG. 3)) in registering the client that made the call identified in block 412 of FIG. 4. Beginning with block 500 of FIG. 5, the service manager receives the call from the client. After receiving this call, the service manager determines the client identity, as indicated in block 502. This step may comprise, for example, identifying the IP address of the client and providing that address to a client information source, such as the server computer 108 (FIG. 1), that can provide identification information concerning the client and/or user. Such information can include, for example, whether the client is connected to the local network, at what location (e.g., port) on the network the client is connected, whether the client is logged in to the network, the name and room number of the user, etc. This information can be obtained by the server computer 108 through communications with the network infrastructure (e.g., network switches). With such information, the service manager can, as indicated in block 504, register the client with the service. Such registration comprises storing client information in an appropriate database. Optionally, this information can also be used prior to registration to confirm that the client (and therefore the user) is authorized to access and use the service.

During the registration process, the service manager can further generate security information for the client, as indicated in block 506. This security information comprises any information that the network-based service can use to authenticate and determine the authorization of the client. By way of example, the security information includes a randomly-generated authorization code, which is used as a "shared secret." In another example, however, the security information comprises encryption information, such as public key encryption information. Regardless, once the security information is generated, it is provided to the client, as indicated in block 508 such that, when the client later attempts to use the service from a remote location, the client can present the security information to the service. Notably, the security information itself may be encrypted to prevent compromise of system security.

In addition to the security information, the service manager can provide other information to the client that the client may need to use the service. For example, the service manager can provide one or more URLs associated with the ports of the service that receive data, such as print data in the printing service context. Optionally, the security information can be embedded in such URLs so that the information will automatically be provided when the client attempts to access the service using one of the URLs. The security information and/or the URLs can be provided to the client in an XML document transmitted to the client via a network protocol, such as HTTP or HTTPS.

Returning to FIG. 4, the security information generated by the service manager is received and stored by the client. At this point, the client is configured to access and use the network-based service from a remote location (or locally via a virtual private network (VPN) connection that extends to a remote network). Although the discovery process described in relation to FIG. 4 may be used to receive the security information, the method with which the security information is obtained may be more simple. For instance, the client can simply contact the network-based service, or vice versa, and the service may simply provide the security information to the client as a consequence of the client being connected to the network that supports the service. To cite an example, the user may register his digital camera and receive security information by simply docking the camera with a computing device that supports the service (or that is connected to a network that supports the service). In such a scenario, the user would be able to access and use the service (e.g., a service that uploads images to a Web site) from a remote location (e.g., while on vacation).

With the registration process described above, the client is automatically configured to use the network-based service from a remote location just by virtue of connecting to the internal network. Therefore, no action is required on the part of the user. Furthermore, no username or password were created and, therefore, need not be remembered by the user or stored by the service. Moreover, due to the automated nature of the process, no human effort is required to create and validate a user account.

Figure 6:
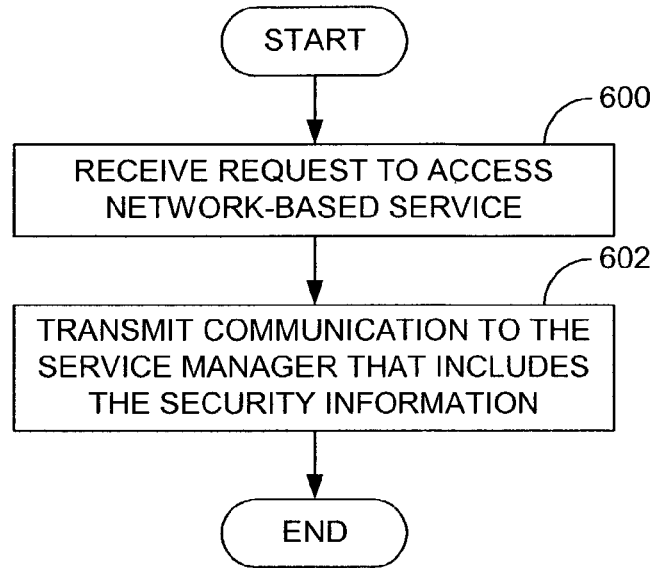
FIG. 6 is a flow diagram that illustrates an embodiment of operation of the client in remotely accessing a network-based service.

FIG. 6 is a flow diagram that illustrates an embodiment of operation of the client in attempting to access and use the network-based service from a remote location. In situations in which the service is a public printing service, the client may comprise the public printing client 212 (FIG. 2) and may be attempting to print on a printing device 106 (FIG. 1) of the service. Beginning with block 600, the client receives a request to access the network-based service. The request may comprise, for example, a print request entered in an appropriate user application (e.g., word processing application).

Upon receiving the request, the client transmits a communication to the service manager that includes the security information, as indicated in block 602. By way of example, the communication may be an HTTP or HTTPS communication posted against a URL of the printing service manager 316 (FIG. 3). In such a case, the security information, which for instance comprises an authorization code, can be embedded in the URL used to access the printing service manager 316.

Figure 7:
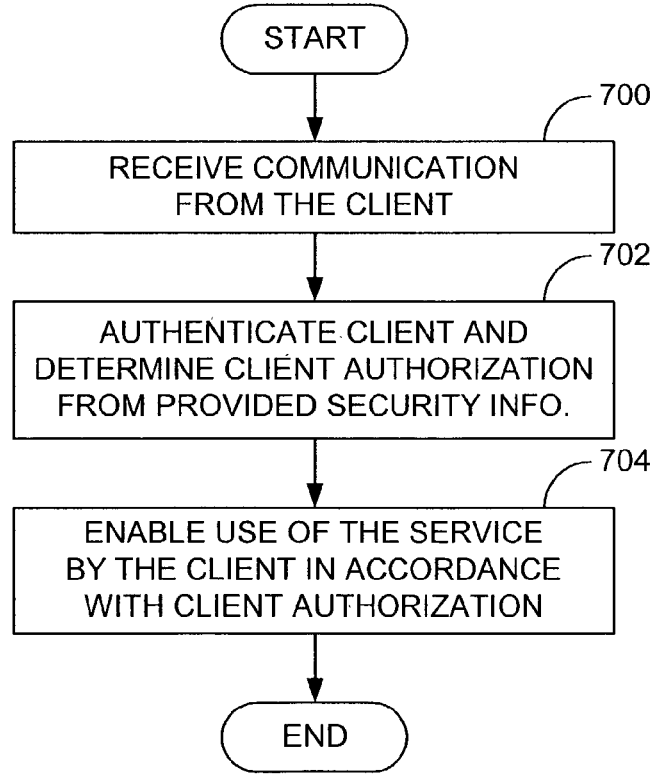
FIG. 7 is a flow diagram that illustrates an embodiment of operation of a service manager in authenticating and determining the authorization of a remote client.

Referring next to FIG. 7, which illustrates an embodiment of operation of the service manager, the communication sent by the client is received by the service manager, as indicated in block 700. Because that communication includes the security information, the service manager can authenticate the client and determine the client authorization to use the service, as indicated in block 702. Assuming the client is authorized to use the service, the service then enables use of the service by the client in accordance with the client authorization, as indicated in block 704.

What is claimed is:

1. A method for automatically configuring a client for remote use of a network-based service, comprising:
    the client automatically calling a service manager that manages a network-based service that is supported on a local network to which the client is connected, the service manager being a single network service application that in addition to managing the network-based service also provides security information to the client;
    the service manager automatically generating security information for the client as a consequence of the client's connection to the local network, the security information being configured to authenticate the client and authorize its use of the network-based service;
    the service manager automatically providing to the client the generated security information;
    the service manager automatically registering the client with the network-based service; and
    the client automatically receiving and storing the security information for later use of the network-based service by the client from a remote location.

2. The method of claim 1, further comprising the client automatically discovering the service manager by sending a request for a network address of the service manager.

3. The method of claim 1, wherein automatically receiving and storing the security information comprises receiving and storing an authentication code.

4. The method of claim 3, wherein receiving and storing an authentication code comprises receiving and storing a universal resource locator (LIRL) of the network-based service in which the authorization code is embedded.

5. The method of claim 1, wherein automatically receiving and storing security information comprises receiving and storing public key encryption information.

6. The method of claim 1, wherein the network-based service is a printing service.

7. The method of claim 1, further comprising the service manager, prior to automatically generating security information for the client, determining the client identity, providing the client identity to a client information source, and receiving information concerning the client from the client information source.

8. The method of claim 7, wherein receiving information concerning the client comprises receiving information concerning one or more of whether the client is connected to the local network, to which port is the client connected, and whether the client is logged in to the local network.

9. The method of claim 1, further comprising the client accessing the network-based service by automatically providing the security information to the network-based service such that no information must be manually entered by a user to use the network-based service.

10. A system that facilitates access and use of a network-based service, comprising:
    a client stored on non-transitory computer-readable media and configured to automatically call a service manager stored on non-transitory computer-readable media and executable to manage a network-based service supported on a local network to which the client is connected and to receive and store security information from the service manager that enables use of the network-based service by the client from a remote location, wherein the service manager and the network-based service are both provided as part of a single network service application stored on non-transitory computer-readable media; and
    the service manager managing the network-based service, the service manager being configured (i) to communicate with clients that are connected to the local network, (ii) to automatically generate security information for the clients as a consequence of their connection to the local network, the security information being configured to authenticate the clients and authorize their use of the network-based service from a remote location, and (iii) to automatically register the clients with the network-based service.

11. The system of claim 10, wherein the security information comprises an authorization code.

12. The system of claim 10, wherein the security information comprises public key encryption information.

13. The system of claim 10, wherein the client is a public printing client and the service manager is a printing service manager that manages a public printing service.

14. The system of claim 10, wherein the service manager is configured to provide the security information embedded in a universal resource locator (URL) of the network-based service.

* * * * *

UNITED STATES PATENT AND TRADEMARK OFFICE
CERTIFICATE OF CORRECTION

| | |
|---|---|
| PATENT NO. | : 8,433,780 B2 |
| APPLICATION NO. | : 10/453980 |
| DATED | : April 30, 2013 |
| INVENTOR(S) | : Darrel D. Cherry et al. |

Page 1 of 1

It is certified that error appears in the above-identified patent and that said Letters Patent is hereby corrected as shown below:

In the Claims

In column 8, line 6, in Claim 4, delete "(LIRL)" and insert -- (URL) --, therefor.

Signed and Sealed this
Fifth Day of August, 2014

Michelle K. Lee
*Deputy Director of the United States Patent and Trademark Office*